United States Patent [19]
Thompson

[11] Patent Number: 6,086,828
[45] Date of Patent: Jul. 11, 2000

[54] HEAT EXCHANGER EFFICIENCY CONTROL BY DIFFERENTIAL TEMPERATURE

[75] Inventor: William L. Thompson, Villa Park, Calif.

[73] Assignee: Megtec Systems, Inc., DePere, Wis.

[21] Appl. No.: 09/171,874

[22] PCT Filed: May 8, 1997

[86] PCT No.: PCT/US97/08009

§ 371 Date: Oct. 27, 1998

§ 102(e) Date: Oct. 27, 1998

[87] PCT Pub. No.: WO97/43527

PCT Pub. Date: Nov. 20, 1997

Related U.S. Application Data

[60] Provisional application No. 60/017,261, May 10, 1996.

[51] Int. Cl.[7] ............................. F01N 3/10; B01D 53/34
[52] U.S. Cl. ..................... 422/173; 422/175; 422/177; 422/178; 422/182; 422/183; 422/109; 422/111; 431/5; 431/7; 110/212; 110/345
[58] Field of Search ................. 422/170–173, 422/175, 177, 178, 182, 183, 109, 111; 431/5, 7, 170; 110/212, 235, 345

[56] References Cited

U.S. PATENT DOCUMENTS

| | | | |
|---|---|---|---|
| 3,870,474 | 3/1975 | Houston | 422/171 |
| 4,267,152 | 5/1981 | Benedick | 422/173 |
| 4,302,426 | 11/1981 | Benedick | 422/173 |
| 4,426,360 | 1/1984 | Benedick | 422/173 |
| 5,163,829 | 11/1992 | Wildenberg | 431/5 |
| 5,186,901 | 2/1993 | Bayer et al. | 422/111 |
| 5,422,077 | 6/1995 | Bayer | 422/111 |

*Primary Examiner*—Hien Tran
*Attorney, Agent, or Firm*—Mitchell D. Bittman; Kevin Lemack

[57] ABSTRACT

A regenerative thermal oxidizer (H-101) includes a number of heat exchange columns (A, B) topped by a combustion chamber (C-101). Contaminated air is directed into one of the columns and oxidation is completed as the flow passes through the combustion chamber (C-101). From the combustion chamber (C-101), the now clean air flows vertically downward through another column and then is directed via an outlet through an outlet manifold and released to atmosphere or recirculated back to the oxidizer (H-101). A combustible fuel is added to the contaminated air prior to its entry into one of the columns. The addition of the combustible fuel is regulated by continuously monitoring the inlet and outlet temperatures (TE-101A, TE-108A), and comparing a difference between these temperatures to a predetermined value. Further control can be achieved by measuring the flow of contaminated air to the oxidizer (H-101) via pressure differential and coordinating that measurement with the temperature differential measurement.

33 Claims, 6 Drawing Sheets

| EQUIPMENT TAG | DESCRIPTION |
|---|---|
| B-101 | OXIDIZER BURNER |
| C-101 | COMBUSTION CHAMBER |
| H-101 | OXIDIZER |
| N-101 | COMPRESSED AIR FILTER |
| P-101 | PROCESS AIR FAN |
| P-102 | COMBUSTION AIR FAN |
| T-101 | COMPRESSED AIR RESERVOIR |

| DIAMOND TAG | DESCRIPTION |
|---|---|
| AI | ANALOG INPUT "TO" PROGRAMMABLE LOGIC CONTROLLER |
| AO | ANALOG OUTPUT "FROM" PROGRAMMABLE LOGIC CONTROLLER |
| DI | DIGITAL INPUT "TO" PROGRAMMABLE LOGIC CONTROLLER |
| DO | DIGITAL OUTPUT "FROM" PROGRAMMABLE LOGIC CONTROLLER |
| I | HARD-WIRE INTERLOCK |
| SAI | ANALOG INPUT "TO" FLAME SAFEGARD |
| SDI | DIGITAL INPUT "TO" FLAME SAFEGARD |
| SDO | DIGITAL OUTPUT "FROM" FLAME SAFEGARD |

| INSTRUMENT TAG | DESCRIPTION |
|---|---|
| BE-101 | FLAME DETECTOR |
| DPSL-101 | COMBUSTION AIR DIFFERENTIAL PRESSURE SWITCH LOW |
| DPT-101 | OXIDIZER PLENUM DIFFERENTIAL PRESSURE TRANSDUCER |
| FCV-101 | OXIDIZER COLUMN "A" EXHAUST POPPET VALVE |
| FCV-102 | OXIDIZER COLUMN "A" INLET POPPET VALVE |
| FCV-103 | OXIDIZER COLUMN "B" INLET POPPET VALVE |
| FCV-104 | OXIDIZER COLUMN "B" EXHAUST POPPET VALVE |
| FCV-106 | PILOT FUEL GAS TRAIN CONTROL SOLENOID VALVE |
| FCV-108 | FUEL GAS INJECTION TRAIN INTERRUPT CONTROL SOLENOID VALVE |
| FCV-109 | PROCESS AIR BLOCK VALVE |
| FCV-110 | MAKE-UP AIR CONTROL DAMPER |
| FT-101 | FUEL GAS FLOW TRANSDUCER |
| MS-102 | COMBUSTION AIR FAN MOTOR STARTER |
| PCV-101 | MAIN FUEL GAS PRESSURE REGULATOR |
| PCV-102 | FUEL GAS INJECTION PRESSURE REGULATOR |
| PCV-103 | COMPRESSED AIR PRESSURE REGULATOR |
| PI-101 | MAIN FUEL GAS SUPPLY PRESSURE GAUGE |
| PI-102 | MAIN FUEL GAS REGULATED PRESSURE GAUGE |
| PI-103 | COMPRESSED AIR PRESSURE GAUGE |
| PI-105 | FUEL GAS INJECTION REGULATED PRESSURE GAUGE |
| PI-106 | PURGE AIR PRESSURE GAUGE |

FIG. 5A

| INSTRUMENT TAG | DESCRIPTION |
|---|---|
| PI-107 | SIGHT GLASS COOLING AIR PRESSURE GAUGE |
| PSH-101 | BURNER FUEL GAS HIGH PRESSURE SWITCH |
| PSH-102 | FUEL GAS INJECTION HIGH PRESSURE SWITCH |
| PSL-101 | MAIN FUEL GAS LOW PRESSURE SWITCH |
| PSL-102 | PROCESS AIR LOW STATIC PRESSURE SWITCH |
| PSL-103 | COMPRESSED AIR LOW PRESSURE SWITCH |
| PI-101 | PROCESS AIR VACUUM TRANSDUCER |
| SG-101 | COMBUSTION CHAMBER SIGHT GLASS |
| SSOV-101 | BURNER FUEL GAS TRAIN PRIMARY SAFETY SHUTOFF VALVE |
| SSOV-102 | BURNER FUEL GAS TRAIN SECONDARY SAFETY SHUTOFF VALVE |
| SSOV-103 | FUEL GAS INJECTION TRAIN PRIMARY SAFETY SHUTOFF VALVE |
| SSOV-104 | FUEL GAS INJECTION TRAIN SECONDARY SAFETY SHUTOFF VALVE |
| SV-101 | OXIDIZER COLUMN "A" EXHAUST POPPET VALVE PILOT CONTROL SOLENOID VALVE |
| SV-102 | OXIDIZER COLUMN "A" INLET POPPET VALVE PILOT CONTROL SOLENOID VALVE |
| SV-103 | OXIDIZER COLUMN "B" INLET POPPET VALVE PILOT CONTROL SOLENOID VALVE |
| SV-104 | OXIDIZER COLUMN "B" EXHAUST POPPET VALVE PILOT CONTROL SOLENOID VALVE |
| TCV-101 | BURNER FUEL GAS/COMBUSTION AIR MICRORATIO CONTROL VALVE |
| TCV-102 | FUEL GAS INJECTION MODULATING CONTROL VALVE |
| TCV-103 | HEAT EXCHANGE BYPASS CONTROL VALVE |
| TE-101A | OXIDIZER INLET THERMOCOUPLE PRIMARY ELEMENT |
| TE-102A | HEAT EXCHANGE COLUMN "A" THERMOCOUPLE PRIMARY ELEMENT |
| TE-103A | HEAT EXCHANGE COLUMN "A" ALTERNATE THERMOCOUPLE PRIMARY ELEMENT |
| TE-104A | COMBUSTION CHAMBER PORT "A" THERMOCOUPLE PRIMARY ELEMENT |
| TE-105A | COMBUSTION CHAMBER PORT "A" THERMOCOUPLE SECONDARY ELEMENT |
| TE-105B | COMBUSTION CHAMBER PORT "B" THERMOCOUPLE PRIMARY ELEMENT |
| TE-106A | COMBUSTION CHAMBER PORT "B" THERMOCOUPLE SECONDARY ELEMENT |
| TE-107A | HEAT EXCHANGE COLUMN "B" THERMOCOUPLE PRIMARY ELEMENT |
| TE-108A | HEAT EXCHANGE COLUMN "B" ALTERNATE THERMOCOUPLE PRIMARY ELEMENT |
| TE-108B | OXIDIZER EXHAUST THERMOCOUPLE PRIMARY ELEMENT |
| TSH-105B | OXIDIZER EXHAUST THERMOCOUPLE SECONDARY ELEMENT |
| TSH-108B | COMBUSTION CHAMBER HIGH TEMPERATURE SWITCH |
| TSL-105B | COMBUSTION CHAMBER LOW TEMPERATURE SWITCH |
| VFD-101 | PROCESS AIR FAN VARIABLE FREQUENCY DRIVE |
| ZI-101 | BURNER FUEL GAS TRAIN PRIMARY SAFETY SHUTOFF VALVE POSITION INDICATOR |
| ZI-102 | BURNER FUEL GAS TRAIN SECONDARY SAFETY SHUTOFF VALVE POSITION INDICATOR |
| ZI-104 | FUEL GAS INJECTION TRAIN PRIMARY SAFETY SHUTOFF VALVE POSITION INDICATOR |
| ZI-105 | FUEL GAS INJECTION TRAIN SECONDARY SAFETY SHUTOFF VALVE POSITION INDICATOR |
| ZS-101 | BURNER FUEL GAS/COMBUSTION AIR MICRORATIO CONTROL VALVE CLOSED PROXIMITY SWITCH |
| ZS-101H | BURNER FUEL GAS/COMBUSTION AIR MICRORATIO CONTROL VALVE HIGH FIRE PROXIMITY SWITCH |
| ZS-101L | BURNER FUEL GAS/COMBUSTION AIR MICRORATIO CONTROL VALVE LOW FIRE PROXIMITY SWITCH |

FIG. 5B

HEAT EXCHANGER EFFICIENCY CONTROL BY DIFFERENTIAL TEMPERATURE

This application claims the benefit of U.S. Provisional Application Ser. No. 60/017,261, filed May 10, 1996.

BACKGROUND OF THE INVENTION

The control and/or elimination of undesirable impurities and by-products from various manufacturing operations has gained considerable importance in view of the potential pollution such impurities and by-products may generate. One conventional approach for eliminating or at least reducing these pollutants is by oxidizing them via incineration. Incineration occurs when contaminated air containing sufficient oxygen is heated to a temperature high enough and for a sufficient length of time to convert the undesired compounds into harmless gases such as carbon dioxide and water vapor.

In view of the high cost of the fuel necessary to generate the required heat for incineration, it is advantageous to recover as much of the heat as possible. To that end, U.S. Pat. No. 3,870,474 (the disclosure of which is herein incorporated by reference) discloses a thermal regenerative oxidizer comprising three regenerators, two of which are in operation at any given time while the third receives a small purge of purified air to force out any untreated or contaminated air therefrom and discharges it into a combustion chamber where the contaminants are oxidized. Upon completion of a first cycle, the flow of contaminated air is reversed through the regenerator from which the purified air was previously discharged, in order to preheat the contaminated air during passage through the regenerator prior to its introduction into the combustion chamber. In this way, heat recovery is achieved.

U.S. Pat. No. 4,302,426 discloses a thermal regeneration anti-pollution system which adjusts for excessive temperatures in the high temperature incineration or combustion zone. To that end, the temperature in the combustion zone is sensed, and when a predetermined high temperature is reached therein, the gases that normally would be passed through the heat exchange bed are instead bypassed around the bed, then combined with other gases that have already been cooled as a result of their normal passage through a heat exchange bed, and are exhausted to atmosphere.

However, basing the bypass operation on the temperature sensed in the combustion or high temperature zone is somewhat inefficient, and can result in undesirable heat spikes. Further problems with such regenerative thermal apparatus are lack of uniform heat distribution in the combustion chamber, and the expense of using a burner or electric heater to maintain combustion chamber temperature. Specifically, typically one or more burners are placed in the combustion chamber to control the combustion chamber temperature. However, areas of the combustion chamber that are not in proximity to the burners tend to be cooler than those areas in proximity to the burners. Areas of lower temperature can result in incomplete combustion of the contaminated process air. Providing additional burners to overcome the problem is not an economical solution. Moreover, continual operation of the burners is the main source of $NO_x$ generated.

U.S. Pat. No. 4,267,152 discloses the injection of natural gas into the contaminated air before it enters the combustion chamber to promote more uniform heat distribution. Combustion chamber temperature is sensed, and once that temperature attains a predetermined level sufficient for auto-ignition of the natural gas, the natural gas injection into the contaminated air is carried out. If the combustion chamber temperature exceeds a predetermined level, the natural gas injection is ceased. This operation is coordinated with burner operation, the latter also being based upon sensed combustion chamber temperature.

However, even with the thermocouple sensing the combustion chamber temperature, low temperatures in areas of the combustion chamber not in proximity to the thermocouple can go undetected, thus leading to incomplete combustion. Similarly, it is also possible for higher than necessary temperatures that are not in the proximity of the thermocouple to go undetected. The presence of higher than necessary temperatures can result in excessive fuel consumption and pressure. Moreover, basing the gas injection on a predetermined temperature limit within a margin of error to ensure complete combustion is inherently inefficient.

It is therefore an object of the present invention to improve the efficiency of such regenerative thermal oxidizers.

It is a further object of the present invention to promote uniform temperature distribution in such regenerative thermal oxidizers.

It is a still further object of the present invention to regulate the thermal heat recovery efficiency of the heat exchange zones of a regenerative thermal oxidizer to insure optimum fuel consumption in the oxidation process.

It is yet a further object of the present invention to minimize and even eliminate the operation of the combustion zone burner once steady state operation has been achieved.

It is a further object of the present invention to trim the thermal heat recovery by way of bypassing the downstream heat exchange zone to adapt the thermal efficiency to the needs of the industrial effluent.

It is still another object of the present invention to regulate the contaminant concentration of the industrial effluent through the dilution of the industrial effluent prior to entering the regenerative thermal oxidizer.

SUMMARY OF THE INVENTION

The problems of the prior art have been solved by the present invention, which provides a regenerative thermal oxidizer in which the oxidizer temperature differential is used to regulate the precise addition of fuel to sustain the combustion process. The industrial effluent to be treated, such as contaminated air, is first passed through a hot heat-exchange bed and into a communicating high temperature oxidation (combustion) chamber or zone, and then through a relatively cool second heat exchange bed. The apparatus preferably includes a number of internally insulated, heat exchange columns filled with heat exchange media such as ceramic refractory material, the heat exchange columns being in fluid communication with an internally insulated combustion chamber. Contaminated air is fed into the apparatus through an inlet manifold containing suitable valving. The air is then directed into the heat exchange media which contains "stored" heat from the previous recovery cycle. As a result, the contaminated air is heated to near oxidation temperatures. Oxidation is completed as the contaminated air passes through the combustion chamber, where one or more burners or other heating means are located. The contaminated air is maintained at the operating temperature for an amount of time sufficient for completing destruction of the contamination. From the combustion chamber, the clean air flows vertically downward through another column containing heat exchange media, thereby storing heat in the media for use in a subsequent inlet cycle when the flow control valves reverse. The resulting clean air is directed via an outlet valve through an outlet manifold and released to atmosphere at a slightly higher temperature than the inlet, or is recirculated back to the oxidizer inlet.

In a first embodiment of the present invention, a first gas temperature of industrial effluent is measured at the inlet of the apparatus, and a second gas temperature is measured at the outlet of the apparatus. The addition of a combustible fuel to the industrial effluent prior to effluent entry into the heat exchange columns is regulated based upon the difference between the first and second temperatures.

In a second embodiment of the present invention, the addition of a combustible fuel to the industrial effluent prior to entry into the regenerative columns is regulated based upon both the difference between the first and second temperatures and the measured industrial effluent flow.

In a third embodiment of the present invention, differential pressure is used to regulate the thermal efficiency of the oxidizer by venting a portion of the clean air from the combustion chamber in response to the differential pressure.

In a fourth embodiment of the present invention, a first gas temperature of industrial effluent is measured at the inlet of the apparatus, and a second gas temperature is measured at the outlet of the apparatus. The temperature differential between the inlet and outlet is used to regulate the thermal efficiency of the oxidizer by venting a portion of the clean air from the combustion chamber in response to that differential.

In a fifth embodiment of the present invention, both the differential pressure and the temperature differential are used to regulate the thermal efficiency of the oxidizer by venting a portion of the clean air from the combustion chamber in response thereto.

In a sixth embodiment of the present invention, the temperature differential is used to regulate the thermal efficiency of the oxidizer by adding dilution air to the contaminated air in response thereto.

BRIEF DESCRIPTION OF THE DRAWINGS

FIGS. 5A and 5B are Tables showing the legend for FIGS. 1 and 2.

DETAILED DESCRIPTION OF THE INVENTION

Preferably the thermal oxidizer regenerative system of the present invention consists of two or three regenerative columns, most preferably two columns, each in fluid communication with a combustion chamber.

Figure 2:
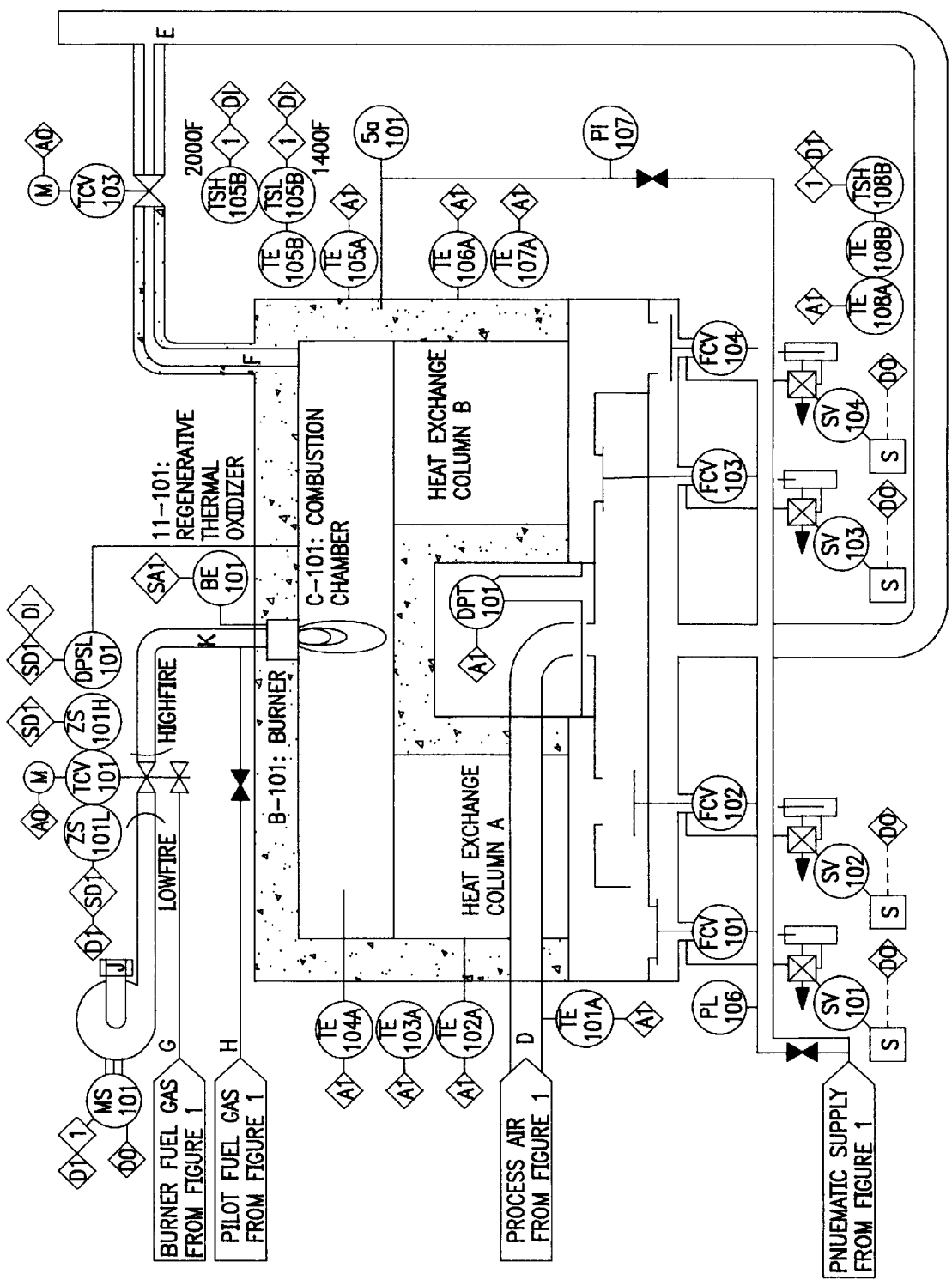
FIG. 2 is a schematic representation of the oxidizer of the present invention.

Turning now to FIG. 2, there is shown a schematic of regenerative thermal apparatus in accordance with a preferred embodiment of the present invention. A first insulated heat exchange column "A" is defined by a thermally insulated outside shell H-101, preferably insulated with ceramic fiber insulation. The heat exchange column "A" contains heat exchange media. Any suitable heat exchange media that can sufficiently absorb and store heat can be used. Preferably, the heat-exchange media is made of a ceramic refractory material having a saddle shape or other shape (e.g., gravel) designed to maximize the available solid-gas interface area. The heat exchange column "A" is in fluid communication with a combustion chamber C-101 having heating means, such as a gas burner B-101 and in which a high temperature is maintained. A fan P-102 supplies combustion air to the burner B-101. Fuel gas is also supplied to the burner B-101 as shown.

A similar second heat exchange column "B" also containing heat exchange media is in fluid communication with the combustion chamber C-101. The combustion chamber C-101 is in fluid communication with exhaust stack E via suitable ducting F, and the amount of clean air exhausted from the combustion chamber C-101 to exhaust stack E is regulated via bypass valve TCV-103 as discussed later.

Figure 1:
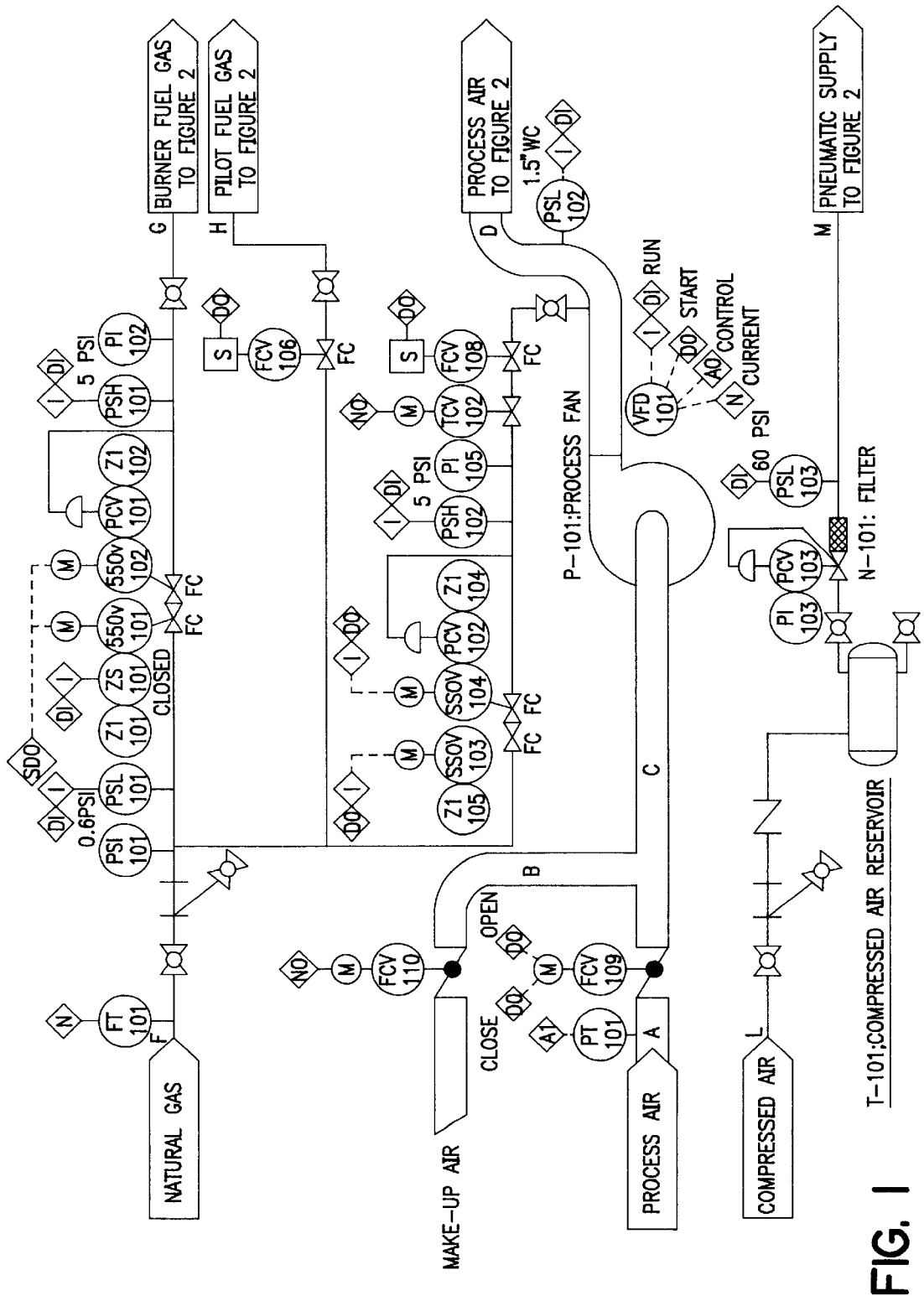
FIG. 1 is a schematic representation of the oxidizer ancillary components of the present invention.

Contaminated air is conveyed to the oxidizer via a process fan P-101 (in FIG. 1) to an inlet valve manifold containing valves FCV-102 and FCV-103. Dilution and/or purge air also can be supplied as necessary by the fan P-101 in communication with make-up air ducting 5 through make-up air valve FCV-11-0 (in FIG. 1). Control of valve FCV-l10 is via analog actuation to allow proportional adjustment capabilities for throttling dilution air. Preferably the valves used in the valve manifolds are poppet type valves in view of their minimal response time. The valve manifolds control the flow direction through the heat exchange columns "AA" and "B". In direction "AA" (shown) flow enters the oxidizer through inlet valve FCV-102. The flow is directed upward through the media in heat exchange column "A" where the contaminated air is preheated. The air travels through the combustion chamber C101 where oxidation of the contaminants is completed, then downward through heat exchange column "B" where the heat of combustion is transferred to the media therein and the now clean air is cooled, then exits the oxidizer through exhaust valve FCV-104. At regular intervals the flow direction through the oxidizer is reversed by the valves shifting to the opposite positions from the previous cycle. Now in direction "BB" (not shown), flow enters the oxidizer through inlet valve FCV-103. The flow is directed upward through the media in heat exchange column "B" where the contaminated air is preheated to combustion temperature. The air travels through the combustion chamber C-101 where oxidation is completed, and then downward through heat exchange column "A" where the heat of combustion is transferred to the media in column "A" and the clean air is again cooled before it exits the oxidizer through exhaust valve FCV-101.

During the start-up, the oxidizer is preheated by burner B-101 to a level that is slightly higher (e.g., 1,600–1,700° F.) than that required for relevant art burner heated oxidation in the combustion chamber (e.g., 1,500° F.). This preheating is carried out to promote the combustion to start to take place in upper regions of the heat exchange columns "A" and "B". Once the oxidizer has achieved steady-state after being initially preheated in the start-up process, the fuel to the burner B-101 in the combustion chamber C-101 is turned off. By minimizing the use of the burner B-101, the amount of $NO_x$ contributed by the burner is minimized, and the thermal efficiency of the oxidizer is optimized by eliminating the non-preheated fuel gas and reducing supplemental combustion air.

Figure 3:
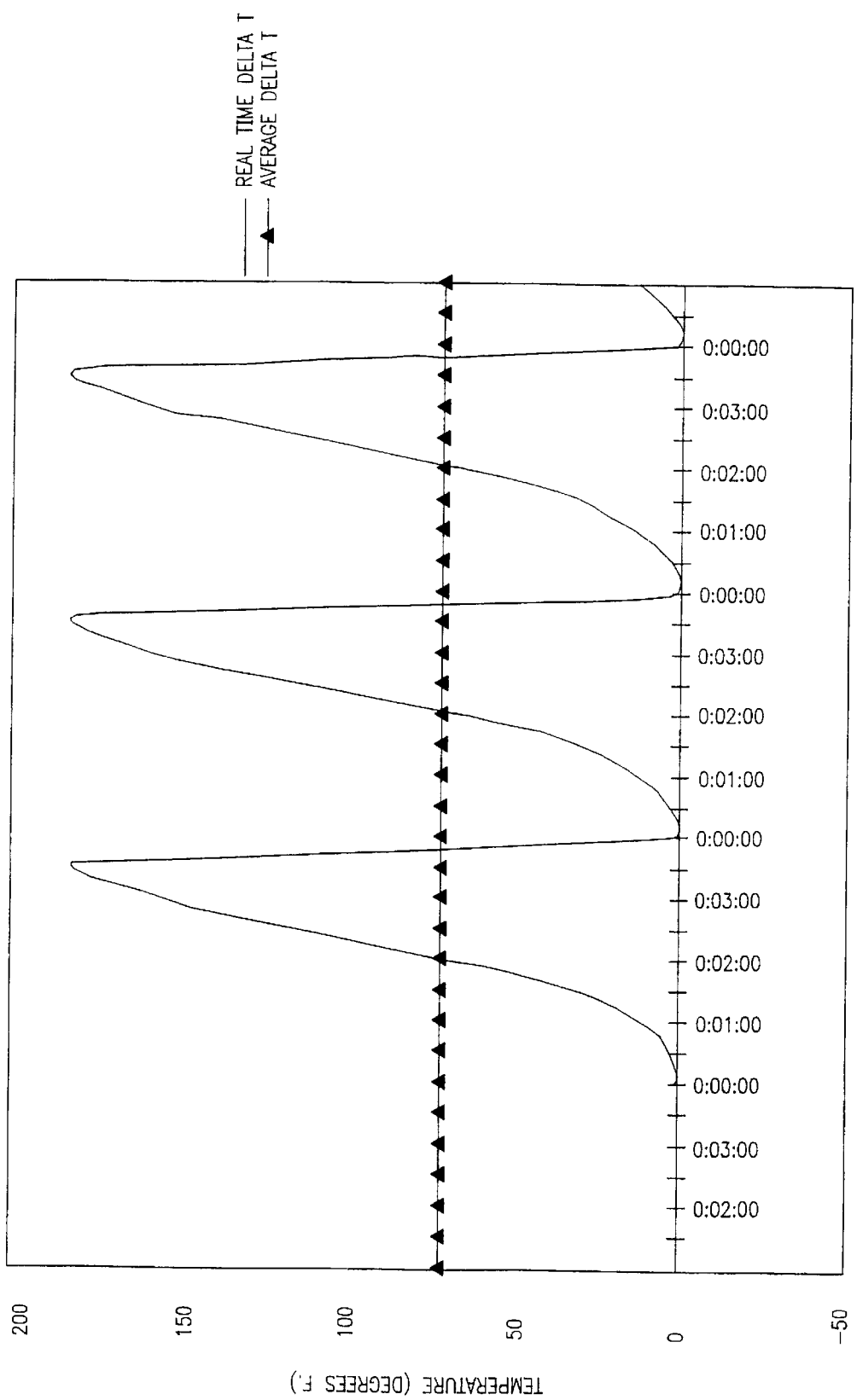
FIG. 3 is a graph showing a typical cycle differential temperature profile over a period of time.

In accordance with a first embodiment of the present invention, the oxidizer inlet temperature TE-101A is sensed or detected by suitable means such as a thermocouple, and is continuously sampled by a PLC. "PLC" is the conventional acronym for "programmable logic controller". A PLC is a device with computing and logic capabilities that among other things is able to sense the input signals of multiple process variables and generate output signals responsive to the input signals as programmed. The location of the oxidizer inlet temperature sensing means is not particularly limited, provided it is prior to (i.e., upstream of) the inlet heat exchange column that heats the incoming contaminated air. The oxidizer exhaust temperature TE-108A is also sensed or detected by suitable means such as a thermocouple, and is continuously sampled by the PLC. The location of the oxidizer outlet or exhaust temperature sensing means is also not particularly limited, provided it is after (i.e., downstream of) the outlet heat exchange column that cools the clean air. The inlet temperature is compared to (e.g., subtracted from) the exhaust temperature to establish the real time differential temperature ("Delta T") of the oxidizer system. FIG. 3 is a graph of a typical cycle differential temperature profile over a 15 minute duration with contaminant loading that is under the "fuel-free" threshold. The nature of the exhaust and therefore the Delta T of a regenerative thermal oxidizer is such that the temperature is continuously changing over the duration of a flow direction cycle. Therefore, preferably the Delta T is averaged to achieve a stable value. This is a moving average taken over a period of time (such as 15 minutes shown in FIG. 3) by creating a stack of values taken at frequent intervals (such as two seconds) to form a true average of the Delta T, as it is non-linear. The oldest value in the stack is eliminated as the newest value is sampled and added to the stack. This average allows the Delta T to reflect changes in the contaminant loading of the contaminated air while still maintaining a steady value from which to control. This Delta T value is the measure of the thermal efficiency of the heat exchange zones of an oxidizer; it indicates the heat value of the contaminated air. For example, when the concentration of contaminants in the contaminated air falls below a certain level, the Delta T will also fall below a certain level, and in response thereto, combustible fuel such as natural gas or propane can be added to the contaminated air at a location prior to its entry into the heat exchange column.

Although the flow of contaminated air to the oxidizer may vary, the Delta T response time to variations can be less than ideal. Accordingly, in accordance with a second embodiment of the present invention, contaminated air flow can be used as the process variable from which to compare and control the fuel gas flow proportional to the contaminated air flow in a prompt manner. Specifically, suitable means to determine flow, such as an anemometer, annubar, orifice, static pressure or other various measurement techniques of the industrial effluent can be used. The preferred means of flow determination is via measurement of oxidizer differential pressure ("Delta P"). Thus, differential pressure transducer DPT-101 (FIG. 2) is in communication with the bottom plenums of each regenerative heat exchange column and measures the differential pressure therebetween. This Delta P has a direct relationship to the total contaminated air flow through the oxidizer when under the fuel-free threshold. A signal generated by the transducer is then transmitted to the PLC which, in conjunction with Delta T, controls the fuel gas flow. To determine a suitable baseline of required fuel gas flow, air free of contamination is initially run through the apparatus and the appropriate amount of fuel gas to operate at the desired efficiency is determined. The Delta T is then preferably used as a process trim variable from which to compare a thermal efficiency control set-point (such as 80° F. for 95% thermal efficiency) to trim or boost the fuel gas control valve (TCV-102 in FIG. 1) to add fuel to maintain the design thermal efficiency of the oxidizer. As the Delta T falls below the thermal efficiency control set-point, TCV-102 is opened to add fuel gas to the contaminated air entering the oxidizer. As the Delta T rises above the thermal efficiency control set-point, TCV-102 is closed to decrease the fuel to the oxidizer.

There is a range at which the fuel contribution from the contaminated air will be greater than the actual heat loss of the oxidizer. In this condition, the Delta T has exceeded the thermal efficiency control set-point and the fuel gas flow is stopped altogether by the closing of the fuel gas flow block valves SSOV-103, SSOV-104 and/or FCV-108 (all shown in FIG. 1). In this condition, the oxidizer is operating "fuel-free" based on the heating value of the contaminants in the contaminated air being destroyed. As the concentration of contaminants in the contaminated air increases, so too will the Delta P and the Delta T increase. As the Delta P rises above the high contaminant condition pressure set-point (such as 24" WC for 95% nominal design thermal efficiency) and/or the Delta T rises above the high contaminant condition temperature control set-point (such as 120° F. for 95% nominal design thermal efficiency), the heat exchange bypass valve TCV-103 in ducting "F" is opened proportionally to vent the excess heat and pressure from the combustion chamber C-101 to the exhaust stack "E" so as to tailor the overall thermal efficiency of the oxidizer to adapt to the needs of the industrial effluent while reducing the overall oxidizer pressure drop and therefor power requirement of process fan P101. This hot-side bypass operation can be used in apparatus equipped with the fuel gas injection means discussed above, or can be used in apparatus devoid of fuel gas injection capabilities. Those skilled in the art will recognize that fuel gas injection and hot-side bypass operation will not operate simultaneously; the operating needs of the oxidizer will require only one at a time, since fuel gas injection is used when the contaminant concentration of the contaminated air is too low for efficient operation, whereas hot-side bypass is used when the contaminant concentration of the contaminated air is too high for efficient operation.

The bypassed clean air can be directly vented to atmosphere, can be combined with other clean air that has already been cooled, and then vented to atmosphere, or can be used as a heat exchange medium to generate steam, etc.

In some industrial applications it may be beneficial to dilute the contaminated air in lieu or in addition to the heat exchange bypass. This dilution can be controlled in a way that is similar to that of Delta T control of the heat exchange bypass. As the Delta T rises above the high contaminant condition temperature set-point, the make-up air valve FCV-110 can be opened proportionally to dilute the industrial effluent prior to entering the oxidizer.

Figure 4:
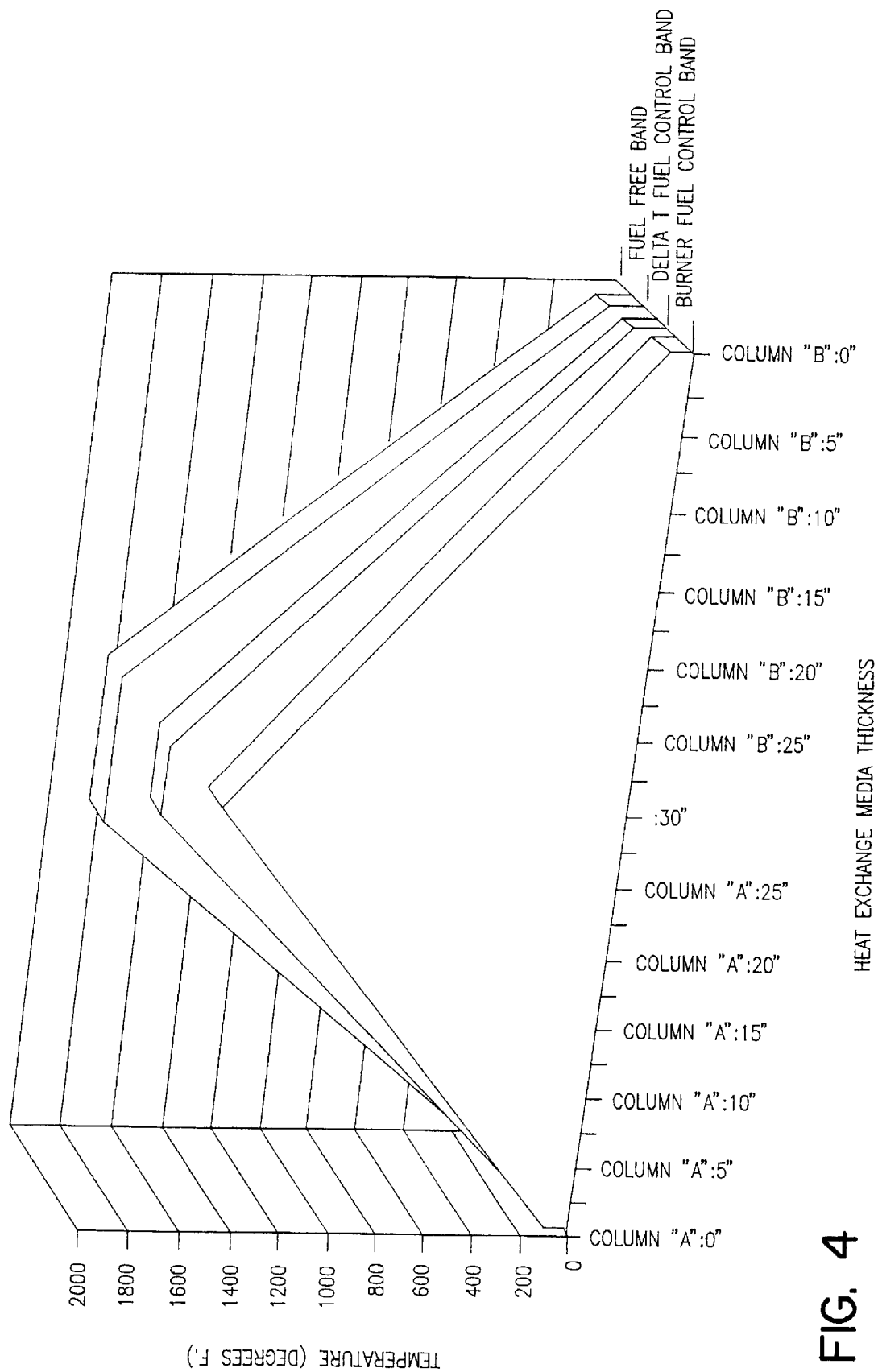
FIG. 4 is a graph showing heat exchanger efficiency control temperature profile in accordance with the present invention.

FIG. 4 is a chart of the operating bands of a regenerative thermal oxidizer. The burner fuel control band is the first sequence that is established during initial start-up of the oxidizer. After start-up, the burner fuel is turned off and the fuel gas is added to the industrial effluent based on the demand called for within the Delta T control band. When the contaminant concentration is adequate, the oxidizer will run fuel-free until the limit of the fuel-free band is met. Once the Delta T is outside of the fuel-free band, the oxidizer will continue to run fuel-free and the excess energy from the rich contaminant concentration in the contaminated air is vented to atmosphere from the combustion chamber C-101 or diluted prior to entering the oxidizer.

Since the fan P-101 feeds the inlet of the oxidizer, the regenerative thermal oxidizer of the present invention utilizes a "forced draft" system rather than the conventional "induced draft" system where the fan is located at the oxidizer exhaust. The forced draft system places the fan in the cooler inlet stream, resulting in a smaller fan. An additional benefit is that the forced draft fan acts as a "buffer" to reduce the effects of valve-induced pressure fluctuations on the upstream industrial effluent.

What is claimed is:

1. A regenerative oxidizer for purifying a gas, comprising:
   at least first and second regenerator columns, each of said columns comprising heat exchange media;
   gas inlet means and gas outlet means in communication with each of said regenerator columns;
   a combustion chamber in communication with each of said regenerator columns;
   means in said combustion chamber for generating heat;
   valve means for alternately directing said gas into the inlet means of one of said columns in a first direction and through another of said columns in a second direction;
   first temperature sensing means for continuously detecting temperature of said gas in a location upstream of said first column;
   second temperature sensing means for continuously detecting temperature of said gas in a location downstream of said second column;
   calculating means for calculating the difference between said temperatures detected by said first and second temperature sensing means; and
   adding means responsive to said calculating means for adding fuel to said gas upstream of said first column when the calculated difference is below a predetermined level.

2. The regenerative oxidizer of claim 1, further comprising averaging means associated with said calculating means for averaging said difference over a period of time.

3. The regenerative oxidizer of claim 1, wherein said adding means adds said fuel with substantially all of said gas.

4. The regenerative oxidizer system of claim 1, wherein said means for generating heat in said combustion chamber comprises a burner.

5. The regenerative oxidizer of claim 1, wherein said fuel comprises natural gas.

6. The regenerative oxidizer of claim 1, further comprising means for sensing flow of said gas upstream of said first column; and wherein said adding means is further responsive to said flow sensing means for adding fuel to said gas upstream of said first column.

7. The regenerative oxidizer of claim 2, further comprising means for sensing flow of said gas upstream of said first column; and wherein said adding means is further responsive to said flow sensing means for adding fuel to said gas upstream of said first column.

8. The regenerative oxidizer of claim 6 wherein said means for sensing flow comprises differential pressure sensing means.

9. The regenerative oxidizer of claim 7 wherein said means for sensing flow comprises differential pressure sensing means.

10. The regenerative oxidizer of claim 8 wherein said differential pressure sensing means senses the pressure differential between a location upstream of said first column and a location downstream of said second column.

11. The regenerative oxidizer of claim 1, further comprising means responsive to said calculating means for venting a portion of said gas from said combustion chamber prior to said gas being cooled by one of said regenerator columns when the differential temperature achieves a predetermined level.

12. The regenerative oxidizer of claim 2, further comprising means responsive to said averaging means for venting a portion of said gas from said combustion chamber prior to said gas being cooled by one of said regenerator columns when the average differential temperature achieves a predetermined level.

13. The regenerative oxidizer of claim 1, further comprising means for sensing the differential pressure between said gas inlet means and said gas outlet means, and means responsive to said differential pressure sensing means for venting a portion of said gas from said combustion chamber prior to said gas being cooled by one of said regenerator columns when said differential pressure achieves a predetermined level.

14. A regenerative oxidizer for purifying a gas, comprising:
   at least first and second regenerator columns, each of said columns comprising heat exchange media;
   gas inlet means and gas outlet means in communication with each of said regenerator columns;
   a combustion chamber in communication with each of said regenerator columns;
   means in said combustion chamber for generating heat;
   valve means for alternately directing said gas into the inlet means of one of said columns in a first direction and through another of said columns in a second direction;
   first temperature sensing means for continuously detecting temperature of said gas in a location upstream of said first column;
   second temperature sensing means for continuously detecting temperature of said gas in a location downstream of said second column;
   calculating means for calculating the difference between said temperatures detected by said first and second temperature sensing means;
   venting means responsive to said calculating means for venting a portion of said gas from said combustion chamber prior to said gas being cooled by one of said regenerator columns when the differential temperature achieves a predetermined level.

15. The regenerative oxidizer of claim 14, further comprising averaging means associated with said calculating means for averaging said difference over a period of time.

16. The regenerative oxidizer of claim 14, further comprising means for sensing differential pressure between said gas inlet means and said gas outlet means, and wherein said venting means is further responsive to said differential pressure sensing means for venting a portion of said gas from said combustion chamber prior to said gas being cooled by one of said regenerator columns.

17. The regenerative oxidizer of claim 15, further comprising means for sensing differential pressure between said gas inlet means and said gas outlet means, and wherein said venting means is further responsive to said differential pressure sensing means for venting a portion of said gas from said combustion chamber prior to said gas being cooled by one of said regenerator columns.

18. A regenerative oxidizer for purifying a gas, comprising:

at least first and second regenerator columns, each of said columns comprising heat exchange media;

gas inlet means and gas outlet means in communication with each of said regenerator columns;

a combustion chamber in communication with each of said regenerator columns;

means in said combustion chamber for generating heat;

valve means for alternately directing said gas into the inlet means of one of said columns in a first direction and through another of said columns in a second direction;

first temperature sensing means for continuously detecting temperature of said gas in a location upstream of said first column;

second temperature sensing means for continuously detecting temperature of said gas in a location downstream of said second column;

calculating means for calculating the difference between said temperatures detected by said first and second temperature sensing means; and dilution means responsive to said calculating means for diluting said gas upstream of said first column when the calculated difference achieves a predetermined level.

19. The regenerative oxidizer of claim 18, further comprising averaging means associated with said calculating means for averaging said difference over a period of time.

20. A process for combusting gas, comprising:

providing at least first and second regenerator columns, each comprising heat exchange media and having gas inlet means and gas outlet means; a combustion chamber in communication with each of said regenerator columns; means in said combustion chamber for generating heat; and valve means for alternately directing said gas into the inlet means of one of said columns in a first direction and through another of said columns in a second direction;

detecting the temperature of said gas in a location upstream of said first column;

detecting the temperature of said gas in a location downstream of said second column;

calculating the difference between said detected temperatures; and adding fuel into said gas when said difference achieves a predetermined level.

21. The process of claim 20, further comprising averaging said calculated temperature difference over time.

22. The process of claim 20, further comprising exhausting a portion of said gas from said combustion chamber in response to when said calculated differential temperature achieves a predetermined level.

23. The process of claim 21, further comprising exhausting a portion of said gas from said combustion chamber in response to when the average temperature difference achieves a predetermined level.

24. The process of claim 20, further comprising sensing flow of said gas upstream of said first column and injecting said fuel into said gas in response to said sensed flow and temperature difference.

25. The process of claim 21, further comprising sensing flow of said gas upstream of said first column and injecting said fuel into said gas in response to said sensed flow and average temperature difference.

26. The process of claim 20, further comprising sensing differential pressure between said gas inlet means and said gas outlet means, and venting a portion of said gas from said combustion chamber prior to said gas being cooled by one of said regenerator columns when said differential pressure achieves a predetermined level.

27. The process of claim 21, further comprising sensing differential pressure between said gas inlet means and said gas outlet means, and venting a portion of said gas from said combustion chamber prior to said gas being cooled by one of said regenerator columns when said differential pressure achieves a predetermined level.

28. A process for combusting gas, comprising:

providing at least first and second regenerator columns, each comprising heat exchange media and having gas inlet means and gas outlet means; a combustion chamber in communication with each of said regenerator columns; means in said combustion chamber for generating heat; and valve means for alternately directing said gas into the inlet means of one of said columns in a first direction and through another of said columns in a second direction;

detecting temperature of said gas in a location upstream of said first column;

detecting the temperature of said gas in a location downstream of said second column;

calculating the difference between said detected temperatures; and venting a portion of said gas from said combustion chamber prior to said gas being cooled by one of said regenerator columns when said calculated difference achieves a predetermined level.

29. The process of claim 28, further comprising averaging said calculated temperature difference over time.

30. The process of claim 28, further comprising sensing differential pressure between said gas inlet means and said gas outlet means, and venting a portion of said gas from said combustion chamber prior to said gas being cooled by one of said regenerator columns in further response to when said differential pressure achieves a predetermined level.

31. The process of claim 29, further comprising sensing differential pressure between said gas inlet means and said gas outlet means, and venting a portion of said gas from said combustion chamber prior to said gas being cooled by one of said regenerator columns in further response to when said differential pressure achieves a predetermined level.

32. A process for combusting gas, comprising:

providing at least first and second regenerator columns, each comprising heat exchange media and having gas inlet means and gas outlet means; a combustion chamber in communication with each of said regenerator columns; means in said combustion chamber for generating heat; and valve means for alternately directing said gas into the inlet means of one of said columns in a first direction and through another of said columns in a second direction;

detecting temperature of said gas in a location upstream of said first column;

detecting the temperature of said gas in a location downstream of said second column;

calculating the difference between said detected temperatures; and adding dilution air to said gas when said difference achieves a predetermined level.

33. The process of claim 32, further comprising averaging said calculated temperature difference over time.

* * * * *